(12) United States Patent
Lee (10) Patent No.: US 11,787,271 B2
(45) Date of Patent: Oct. 17, 2023

(54) SLIDING DOOR DEVICE FOR VEHICLE

(71) Applicants: Hyundai Motor Company, Seoul (KR); Kia Corporation, Seoul (KR)

(72) Inventor: Jaeseung Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/903,736

(22) Filed: Sep. 6, 2022

(65) Prior Publication Data
US 2023/0182550 A1 Jun. 15, 2023

(30) Foreign Application Priority Data
Dec. 15, 2021 (KR) .................. 10-2021-0179750

(51) Int. Cl.
*B60J 5/06* (2006.01)
(52) U.S. Cl.
CPC ........................ *B60J 5/06* (2013.01)
(58) Field of Classification Search
CPC .. B60J 5/06; B60J 5/047; E05D 15/13; E05D 15/101; E05D 2015/026
USPC ........................................................ 296/155
See application file for complete search history.

(56) References Cited

U.S. PATENT DOCUMENTS

| | | | |
|---|---|---|---|
| 9,587,724 B2 * | 3/2017 | Choi .................. E05D 15/58 |
| 9,777,811 B2 * | 10/2017 | Choi .................. E05D 15/101 |
| 11,384,580 B2 * | 7/2022 | Yun .................... B60J 5/06 |
| 11,505,045 B2 * | 11/2022 | Yun .................... E05D 15/101 |
| 11,555,343 B2 * | 1/2023 | Yun .................... B60J 5/047 |
| 2021/0079703 A1 * | 3/2021 | Yun .................... E05D 15/30 |
| 2022/0412142 A1 * | 12/2022 | Lee .................... E05D 15/58 |
| 2023/0173897 A1 * | 6/2023 | Lee .................... B60J 5/06 296/146.1 |
| 2023/0184015 A1 * | 6/2023 | Lee .................... B60J 5/06 296/155 |
| 2023/0202272 A1 * | 6/2023 | Lee .................... E05F 15/632 49/70 |
| 2023/0202273 A1 * | 6/2023 | Lee .................... B60J 5/06 296/146.1 |

* cited by examiner

*Primary Examiner* — Jason S Morrow
(74) *Attorney, Agent, or Firm* — MORGAN, LEWIS & BOCKIUS LLP (57) ABSTRACT

A sliding door device for a vehicle includes a door configured to open or close a door opening formed in a vehicle body, a door arm including one end portion rotatably connected to the door and the other end portion provided to be movable along a side sill of the vehicle body, a mover connected to the other end portion of the door arm and configured for straight line movement along the side sill of the vehicle body, a door arm plate configured to rotatably connect the mover with the other end portion of the door arm and provided to perform cycloid rotation and straight line movement when the mover moves along the side sill, a pin provided to protrude on the door arm plate, and a cycloid rail provided in the side sill and configured to provide a path on which the roller moves when the other end portion of the door arm moves along the side sill.

16 Claims, 6 Drawing Sheets

SLIDING DOOR DEVICE FOR VEHICLE

CROSS-REFERENCE TO RELATED APPLICATION

The present application claims priority to Korean Patent Application No. 10-2021-0179750 filed on Dec. 15, 2021, the entire contents of which is incorporated herein for all purposes by this reference.

BACKGROUND OF THE PRESENT DISCLOSURE

Field of the Present Disclosure

The present disclosure relates to a sliding door device for a vehicle. More particularly, the present disclosure relates to a sliding door device for a vehicle configured to open or close a door opening of a vehicle body by sliding back and forth in a longitudinal direction of the vehicle.

Description of Related Art

In general, a vehicle has a vehicle compartment having a predetermined size capable of accommodating a driver or a fellow rider, and a vehicle compartment opening/closing door is provided in the vehicle body to open or close the vehicle compartment.

In the case of a passenger vehicle, the vehicle compartment opening/closing door includes a front door provided in the front in the longitudinal direction of the vehicle and a rear door provided in the rear in the longitudinal direction of the vehicle, and the front door and the rear door are usually rotatably provided in the vehicle body by hinges.

In the case of a van which may accommodate many people, the vehicle compartment opening/closing door slides back and forth in the longitudinal direction of the vehicle to open or close the vehicle compartment.

In the sliding-type vehicle compartment opening/closing door of the van, the vehicle compartment opening/closing door moves rearward in the longitudinal direction of the vehicle to open the vehicle compartment, while moving forward in the longitudinal direction of the vehicle to close the vehicle compartment. Therefore, it is advantageous in that the opening/closing space required for opening and closing the door is smaller than that of the hinge-type vehicle compartment opening/closing door such as the passenger vehicle, and the door opening formed in the vehicle body may be completely opened even in a narrow opening/closing space.

However, in the conventional sliding-type vehicle compartment opening/closing door, because a space where the door arm intrudes into a side sill part of the vehicle is excessive due to the fixed sliding door arm structure when opening and closing the door, there is a problem in that the height of the floor of the vehicle needs to be increased to secure a space therefor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to adopting a sliding door structure using a cycloid curved line motion to solve the problem of excessive space intrusion into the side sill part of a vehicle by the door arm.

Various aspects of the present disclosure are directed to providing a sliding door device for a vehicle including a door configured to open or close a door opening formed in a vehicle body, a door arm including a first end portion rotatably connected to the door and a second end portion provided to be movable along a side sill of the vehicle body, a mover rotatably connected to the second end portion of the door arm and configured for straight line movement along the side sill of the vehicle body, a door arm plate rotatably connecting the mover with the second end portion of the door arm and provided to perform cycloid rotation and straight line movement when the mover moves along the side sill, a pin provided to protrude on the door arm plate, and a cycloid rail provided in the side sill and configured to provide a path on which the pin moves when the second end portion of the door arm moves along the side sill.

The door arm may include a first link including a first end portion rotatably connected to a first point of the door, a second link including a first end portion rotatably connected to a second end portion of the first link, a third link including a first end portion rotatably connected to a second point of the door spaced from the first point of the door with a predetermined distance, a fourth link including a first end portion rotatably connected to a second end portion of the third link, and a center link connecting a second end portion of the second link with a second end portion of the fourth link.

The second end portion of the first link and the first end portion of the second link, the second end portion of the third link and the first end portion of the fourth link, and a center portion of the second link and a center portion of the third link may be provided to be rotatably connected by link pins.

The center link, the mover, and the door arm plate may be connected by a center pin, and the door arm plate may be provided to rotate around the center pin.

The mover may be connected to the center pin by a mover connection link which is connected to the mover and extends toward the door side.

First end portion of the first link and first end portion of the third link may be connected to the door to be hingedly rotatable by a door pin.

The second end portion of the second link and the second end portion of the fourth link may be connected by roller pins respectively, and the roller pins may be provided to protrude through the door arm plate.

The roller pins may be provided at an edge portion of the door arm plate to face each other around the center pin.

The roller may be rotatably mounted around the roller pin on a circumference of an end portion of the roller pin.

The cycloid rail may include a curved portion and a straight line portion extending from the curved portion in a longitudinal direction of the side sill.

In a state where the door is closed, the roller may be positioned at an end portion of the curved portion of the cycloid rail.

When the door is opened, the roller may move from the end portion of the curved portion toward the straight line portion, and the door arm plate may operate to perform cycloid rotation.

When the door is opened, the second link and the third link may operate to change into a state where they vertically intersect each other according to the cycloid rotation of the door arm plate.

When the door is opened, the door may operate to move away from the side sill.

When the door is opened, after the second link and the third link vertically intersect each other, the door arm plate may halt rotation, and the roller may operate to move along the straight line portion of the cycloid rail.

According to various exemplary embodiments of the present disclosure, by adopting the sliding door structure including one roller and a plurality of links including a cycloid curved line trajectory, it is possible to reduce an amount of intrusion into the interior of the vehicle body by the door arm and thus realize a flat structure of the vehicle body, reducing the step height of the vehicle body.

Furthermore, by maximizing space utilization between the door and the side sill, it is possible to improve the degree of freedom for layout and the degree of freedom for interior design.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, with reference to the accompanying drawings, various exemplary embodiments of the present disclosure will be described in detail so that a person of an ordinary skill in the art to which an exemplary embodiment of the present disclosure pertains may easily implement the same. The present disclosure may be embodied in several different forms and is not limited to the exemplary embodiments described herein.

Furthermore, in various exemplary embodiments of the present disclosure, constituent elements having the same configuration are typically described in an exemplary embodiment with the same reference numerals, and only configurations different from an exemplary embodiment will be described in other exemplary embodiments of the present disclosure.

It is noted that the drawings are schematic and not drawn to scale. Relative dimensions and ratio of parts in the drawings are shown in enlarged or reduced size for clarity and convenience in the drawings, and any dimension is merely illustrative but not limiting. In addition, the same reference numerals are used to indicate similar features to the same structure, element, or part shown in two or more drawings. When a part is referred to as being "above" or "on" another part, the part may be directly on the other part or another part may be involved therebetween.

The present disclosure specifically represents an exemplary embodiment of the present disclosure. As a result, numerous variations of the diagram are expected. Accordingly, the exemplary embodiment of the present disclosure is not limited to a specific form of the illustrated area, and includes, for example, modification in the form by manufacturing.

Hereinafter, a structure of a sliding door device for a vehicle according to various exemplary embodiments of the present disclosure will be described in detail with reference to the accompanying drawings.

Figure 1:
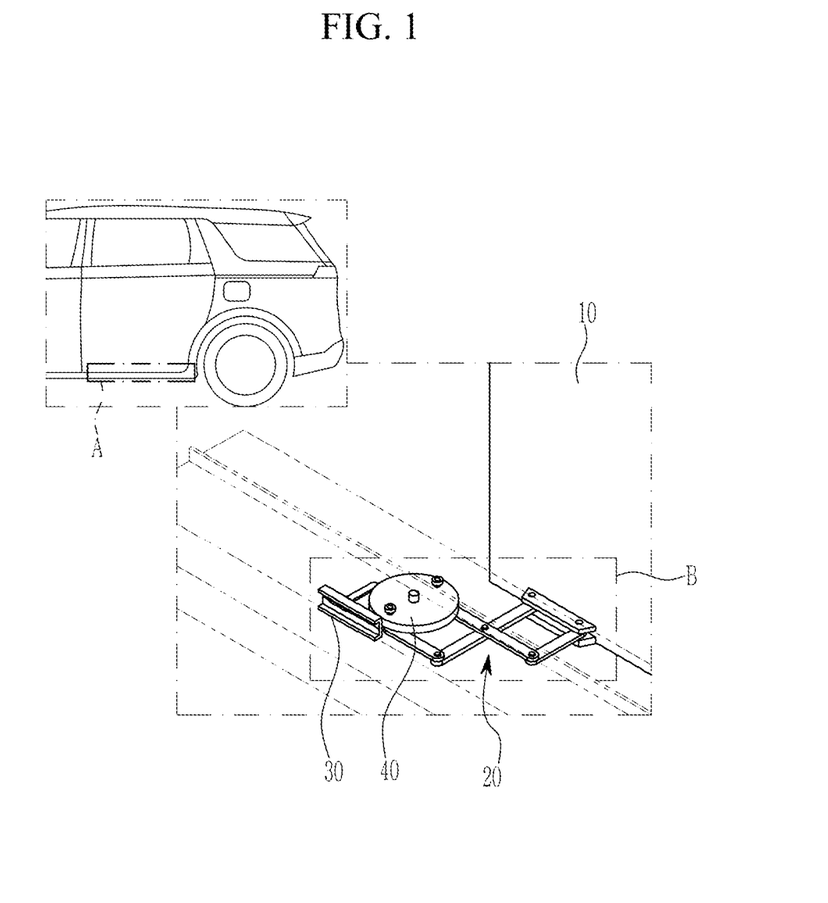
FIG. 1 is a diagram schematically illustrating a sliding door device for a vehicle according to various exemplary embodiments of the present disclosure.
Figure 2:
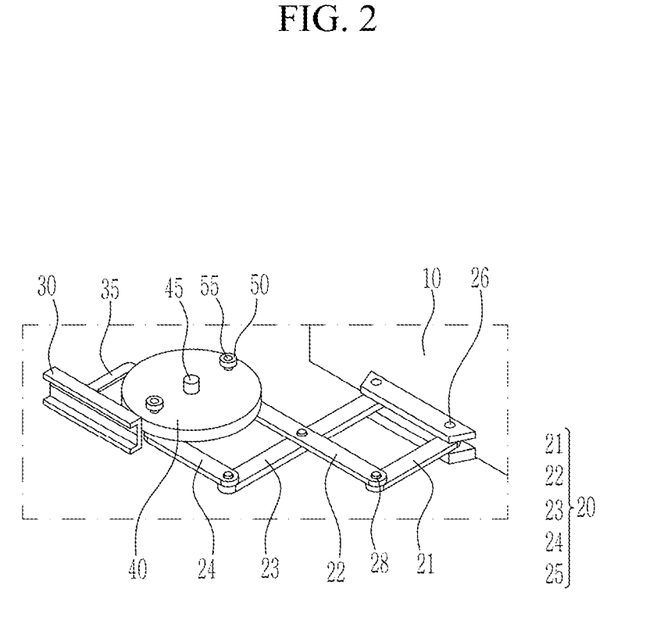
FIG. 2 is an enlarged view of part 'B' of FIG. 1.

FIG. 1 is a diagram schematically illustrating a sliding door device configured for a vehicle according to various exemplary embodiments of the present disclosure, and FIG. 2 is an enlarged view of portion 'B' of FIG. 1.

Referring to FIG. 1, the sliding door device for a vehicle according to various exemplary embodiments of the present disclosure may be applied to a lower side, that is, to a portion 'A' of a rear door 10 provided at the rear in the longitudinal direction of the vehicle, and may be applied to a structure in which the rear door 10 is opened or closed by movement toward the internal and external directions of the vehicle and forward and backward sliding movement in the longitudinal direction of the vehicle.

Referring to FIG. 2, the sliding door device for a vehicle according to various exemplary embodiments of the present disclosure includes a door 10, a door arm 20, a mover 30, a door arm plate 40, a roller 50, and a cycloid rail 60.

The door 10 opens or closes a door opening formed in the vehicle body of the vehicle, and the door arm 20 is connected to the door 10 and the vehicle body. The door arm 20 may include a first link 21 to a fourth link 24, and a center link 25. One end portion of the first link 21 may be rotatably connected to a first point of the door 10, and one end portion of the second link 22 may be rotatably connected to the other end portion of the first link 21. One end portion of the third link 23 is rotatably connected to a second point of the door spaced from the first point of the door 10 with a predetermined distance, and one end portion of the fourth link 24 may be rotatably connected to the other end portion of the third link 23. Furthermore, the center link 25 may connect the other end portion of the second link 22 and the other end portion of the fourth link 24.

The other end portion of the first link 21 and one end portion of the second link 22 may be rotatably connected by a link pin 28. Furthermore, the other end portion of the third link 23 and one end portion of the fourth link 24 may be rotatably connected by the link pin 28. Furthermore, a center portion of the second link 22 and a center portion of the third link 23 may be rotatably connected by the link pin 28.

Due to a structure connected by the link pin 28, the first link 21 to the fourth link 24, and the center link 25 are rotatable in association with each other.

The movers 30 are spaced from each other with a predetermined distance to face the door 10, and are movably coupled to the side sill 15 to move along the side sill 15. The side sill 15 may be disposed on the lower lateral side of the vehicle body in the longitudinal direction of the vehicle body, and a side rail providing a path for the mover 30 to move may be provided on the side sill 15.

The mover 30 may be connected to the center link 25 connecting the other end portion of the door arm 20, that is, the other end portion of the second link 22 and the other end portion of the fourth link 24, and connected to the center portion of the center link 25 by a mover connection link 35 which is connected to the mover 30 and extends toward the door 10.

The door arm plate 40 may rotatably connect the center link 25 and the mover 30, and may be provided to perform cycloid rotation and straight line movement when the mover 30 moves along the side sill 15. The door arm plate 40 may have a circular plate shape, and a center pin 45 is provided at a center portion to enable rotation around the center pin 45. The center link 25 and the mover connection link 35 may be connected to the center pin 45.

On the other hand, one end portion of the first link 21 and one end portion of the third link 23 are connected to the first point and the second point of the door 10 respectively by a door pin 26, facilitating hinge rotation in accordance with the movement of the door 10.

The roller 50 may be provided to protrude on the upper surface of the door arm plate 40. The roller 50 may be rotatably mounted around a roller pin 55 on a circumference of an end portion of the roller pin 55. The roller pins 55 may be provided at an edge portion of the door arm plate 40 to face each other around the center pin 45, and may be provided to protrude through the door arm plate 40. Furthermore, the other end portion of the second link 22, the other end portion of the fourth link 24, and both end portions of the center link 25 may be connected by the roller pins 55.

The cycloid rail 60 is provided in the side sill 15, and may provide a path for the roller 50 to move when the other end portion of the door arm 20 moves along the side sill 15.

Figure 3:
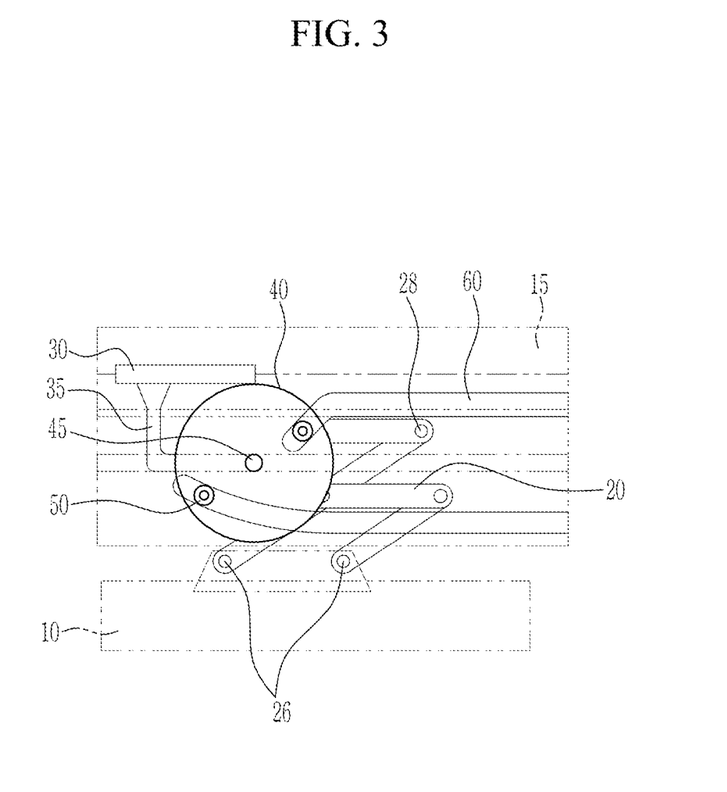
FIG. 3 is a top plan view exemplarily illustrating a door close state of a sliding door device for a vehicle according to various exemplary embodiments of the present disclosure.

FIG. 3 is a top plan view exemplarily illustrating a door close state of a sliding door device for a vehicle according to various exemplary embodiments of the present disclosure.

Referring to FIG. 3, the cycloid rail 60 may include a curved portion and a straight line portion extending from the curved portion in the longitudinal direction of the side sill 15. In a state in which the door 10 is closed, the roller 50 may be positioned at an end portion of the curved portion of the cycloid rail 60. In the instant case, the center link 25 may be positioned at an angle of less than 90° with respect to the side sill 15, and the first link 21 to the fourth link 24 may be folded together. Furthermore, the door 10 is in the door closed state while the door 10 and the side sill 15 are at a position closest to each other.

Figure 4:
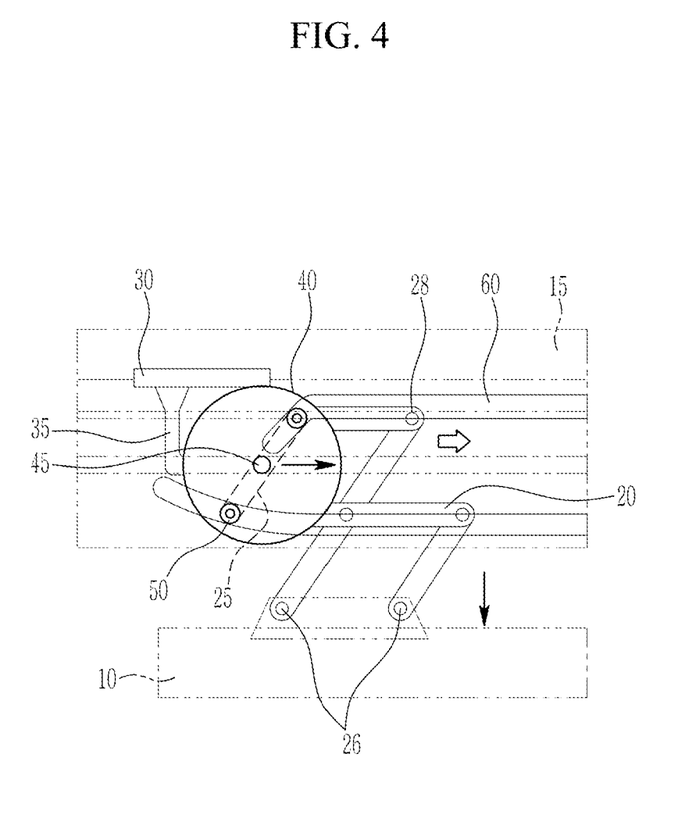
FIG. 4 is a diagram illustrating a state in which a door moves toward the outside of a vehicle body in an open state of a sliding door device for a vehicle according to various exemplary embodiments of the present disclosure.

FIG. 4 is a diagram illustrating a state in which a door moves toward the outside of a vehicle body in an open state of a sliding door device for a vehicle according to various exemplary embodiments of the present disclosure.

Referring to FIG. 4, when the door 10 starts to open, the roller 50 moves from the end portion of the curved portion of the cycloid rail 60 toward the straight line portion, and accordingly, the door arm plate 40 performs cycloid rotation. The center link 25 performs rotation to have a gradually increasing angle with respect to the side sill 15, and accordingly, the first link 21 to the fourth link 24 are unfolded while the door 10 gradually moves away from the side sill 15. Accordingly, the door 10 is opened while the door 10 moves toward the outside of the vehicle body.

Figure 5:
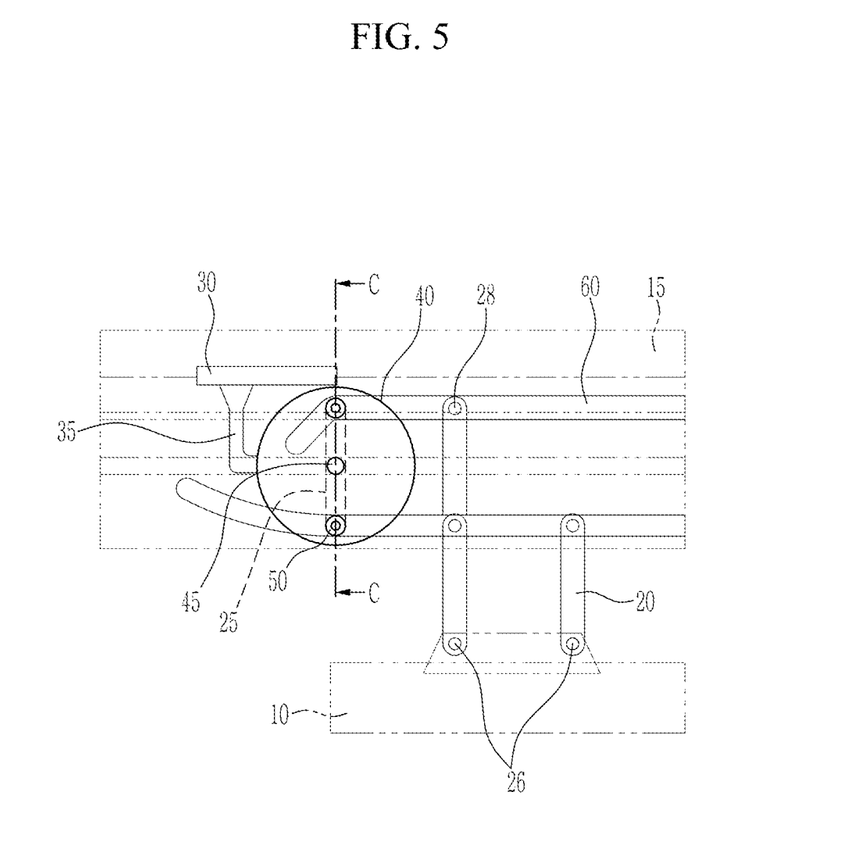
FIG. 5 is a diagram illustrating a state in which a door moves in a longitudinal direction of a vehicle body in an open state of a sliding door device for a vehicle according to various exemplary embodiments of the present disclosure.

FIG. 5 is a diagram illustrating a state in which a door moves in the longitudinal direction of a vehicle body in an open state of a sliding door device for a vehicle according to various exemplary embodiments of the present disclosure.

Referring to FIG. 5, the center link 25 is positioned at an angle vertical to the side sill 15 in accordance with the cycloid rotation of the door arm plate 40, and the second link 22 and the third link 23 are changed into a state where they vertically intersect each other. At the instant time, the movement of the door 10 to the outside of the vehicle body is completed, and the rotation of the door arm plate 40 is also halted. After that, the roller 50 moves along the straight line portion of the cycloid rail 60 so that the door 10 moves in the longitudinal direction of the vehicle body, and the opening of the door 10 is completed.

Because the closing process of the door 10 is the same as the reverse order of the door opening process described with reference to FIG. 3 to FIG. 5, descriptions thereof will be omitted.

Figure 6:
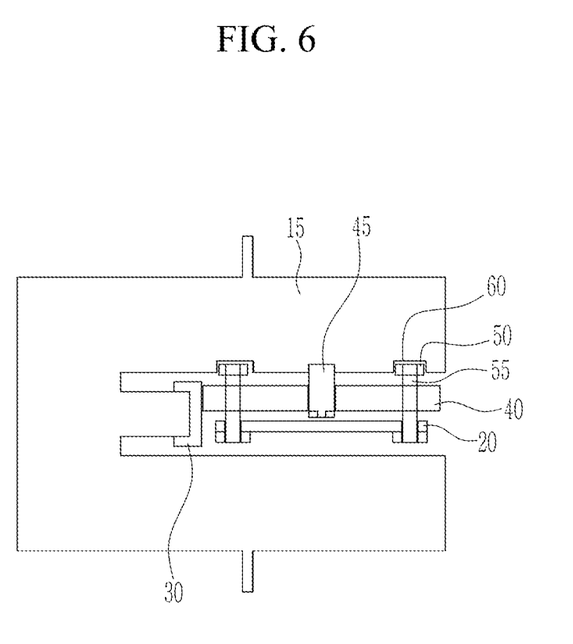
FIG. 6 is a cross-sectional view exemplarily illustrating a state cut along a line 'C-C' of FIG. 5.

FIG. 6 is a cross-sectional view exemplarily illustrating a state cut along a line 'C-C' of FIG. 5.

Referring to FIG. 6, when the door 10 moves in the longitudinal direction of the vehicle body when opening the sliding door device for a vehicle according to various exemplary embodiments of the present disclosure, the roller 50 gets to move by being inserted into the cycloid rail 60 formed on the upper bottom surface of the side sill 15. The roller 60 is mounted on the circumference of the end portion of the roller pin 55 provided to protrude through the door arm plate 40. Furthermore, the center pin 45 is provided to penetrate through the center portion of the door arm plate 40, and the mover 30 may be moved from the inside of the side sill 15 along the side sill 15 in the longitudinal direction thereof. When the door 10 starts to open, the roller 50 performs rotation within the cycloid rail 60, the door arm plate 40 moves in the longitudinal direction of the side sill 15, and the door 10 moves in the longitudinal direction of the side sill 15 through the door arm 20 connected to the door arm plate 40.

As described above, according to various exemplary embodiments of the present disclosure, the sliding door device for a vehicle adopts a sliding door structure including the roller and a plurality of links including a cycloid curved line trajectory, reducing the indoor intrusion amount of the door arm into the vehicle body to realize a flat structure of the vehicle body. Thus, the step height of the vehicle body may be reduced.

Furthermore, by maximizing the space utilization between the door and the side sill, it is possible to improve the degree of freedom for layout and the degree of freedom for interior design.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:
    a door configured to open or close a door opening formed in a vehicle body;
    a door arm including a first end portion rotatably connected to the door and a second end portion provided to be movable along a side sill of the vehicle body;
    a mover rotatably connected to the second end portion of the door arm and configured for straight line movement along the side sill of the vehicle body;
    a door arm plate rotatably connecting the mover with the second end portion of the door arm and provided to perform cycloid rotation and straight line movement when the mover moves along the side sill; and
    a roller pin provided to protrude on the door arm plate; and
    a cycloid rail provided in the side sill and configured to provide a path on which the roller pin moves when the second end portion of the door arm moves along the side sill.

2. The sliding door apparatus of claim 1, further including a roller rotatably mounted on the roller pin.

3. The sliding door apparatus of claim 1, wherein the door arm includes:
    a first link including a first end portion rotatably connected to a first point of the door;
    a second link including a first end portion rotatably connected to a second end portion of the first link;
    a third link including a first end portion rotatably connected to a second point of the door spaced from the first point of the door with a predetermined distance;
    a fourth link including a first end portion rotatably connected to a second end portion of the third link; and
    a center link connecting a second end portion of the second link with a second end portion of the fourth link.

4. The sliding door apparatus of claim 2, wherein the second end portion of the first link and the first end portion of the second link, the second end portion of the third link and the first end portion of the fourth link, and center portions of the second link and the third link are provided to be rotatably connected by link pins.

5. The sliding door apparatus of claim 2, wherein the center link, the mover, and the door arm plate are connected by a center pin, and the door arm plate is provided to rotate around the center pin.

6. The sliding door apparatus of claim 5, wherein the mover is connected to the center pin by a mover connection link which is connected to the mover and extends toward the door.

7. The sliding door apparatus of claim 2, wherein the first end portion of the first link and the first end portion of the third link are connected to the door to be hingedly rotatable by a door pin.

8. The sliding door apparatus of claim 4,
    wherein the roller pin is in plural, and
    wherein the second end portion of the second link and the second end portion of the fourth link are respectively connected by the roller pins, and
    wherein the roller pins are provided to protrude through the door arm plate.

9. The sliding door apparatus of claim 8, wherein the roller pins are provided at an edge portion of the door arm plate to face each other around a center pin connecting the center link, the mover, and the door arm plate.

10. The sliding door apparatus of claim 9, wherein rollers are rotatably mounted around the roller pins on a circumference of an end portion of the roller pins.

11. The sliding door apparatus of claim 1, wherein the cycloid rail includes a curved portion and a straight line portion extending from the curved portion in a longitudinal direction of the side sill.

12. The sliding door apparatus of claim 11, wherein in a state where the door is closed, the roller pin is positioned at an end portion of the curved portion of the cycloid rail.

13. The sliding door apparatus of claim 12, wherein when the door is opened, the roller pin moves from the end portion of the curved portion toward the straight line portion, and the door arm plate operates to perform the cycloid rotation.

14. The sliding door apparatus of claim 3, wherein when the door is opened, the second link and the third link operates to change into a state where the second link and the third link vertically intersect each other according to the cycloid rotation of the door arm plate.

15. The sliding door apparatus of claim 14, wherein when the door is opened, the door operates to move away from the side sill.

16. The sliding door apparatus of claim 15, wherein when the door is opened, after the second link and the third link vertically intersect each other, the door arm plate halts rotation, and the roller pin operates to move along the straight line portion of the cycloid rail.

* * * * *